Oct. 13, 1953          G. DI PALO          2,655,383
FLUID PRESSURE OPERATED ROTARY WORK OR TOOL HOLDER
Filed Aug. 21, 1951          8 Sheets-Sheet 1
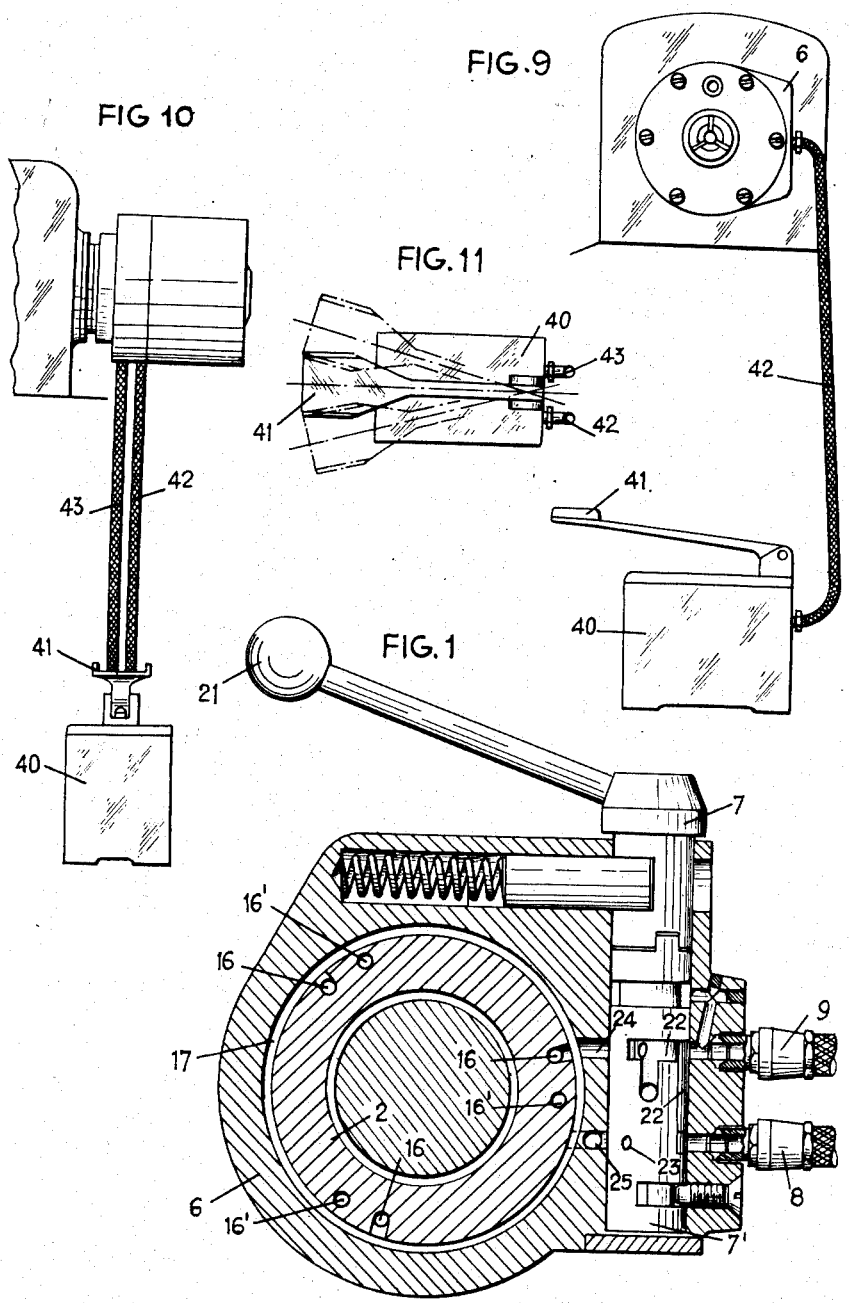
Inventor
Guiseppi di Pali
By Robert E Burns
Attorney Oct. 13, 1953 G. DI PALO 2,655,383
FLUID PRESSURE OPERATED ROTARY WORK OR TOOL HOLDER
Filed Aug. 21, 1951 8 Sheets-Sheet 2
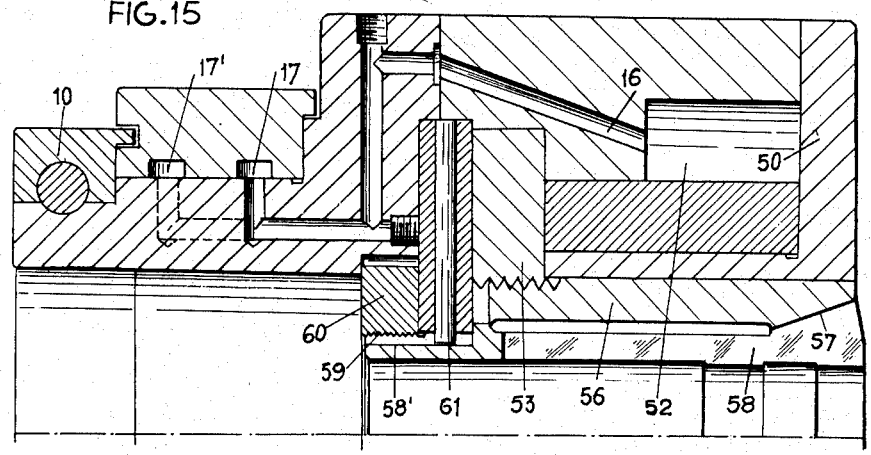
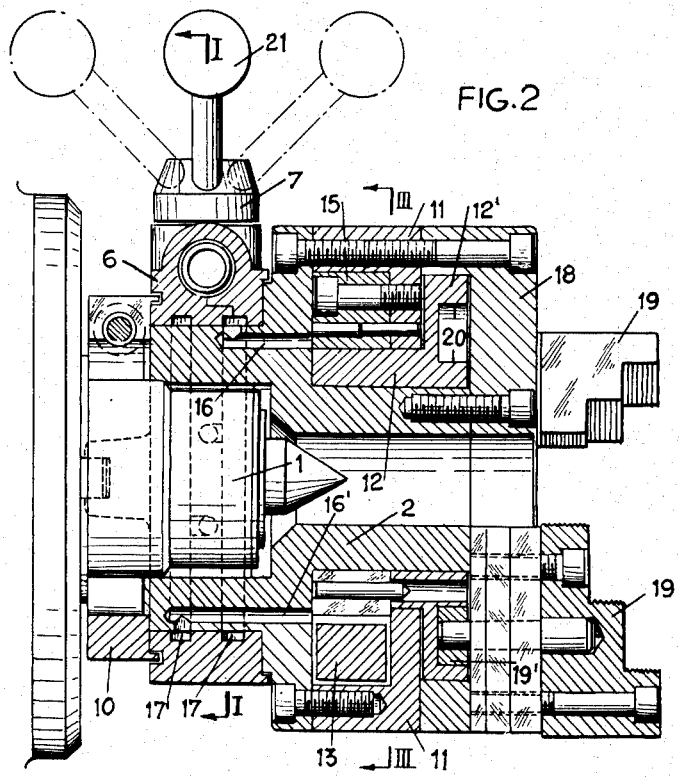
Inventor
Guiseppi di Pali
By Robert E Burns
Attorney Oct. 13, 1953     G. DI PALO     2,655,383
FLUID PRESSURE OPERATED ROTARY WORK OR TOOL HOLDER
Filed Aug. 21, 1951     8 Sheets-Sheet 3
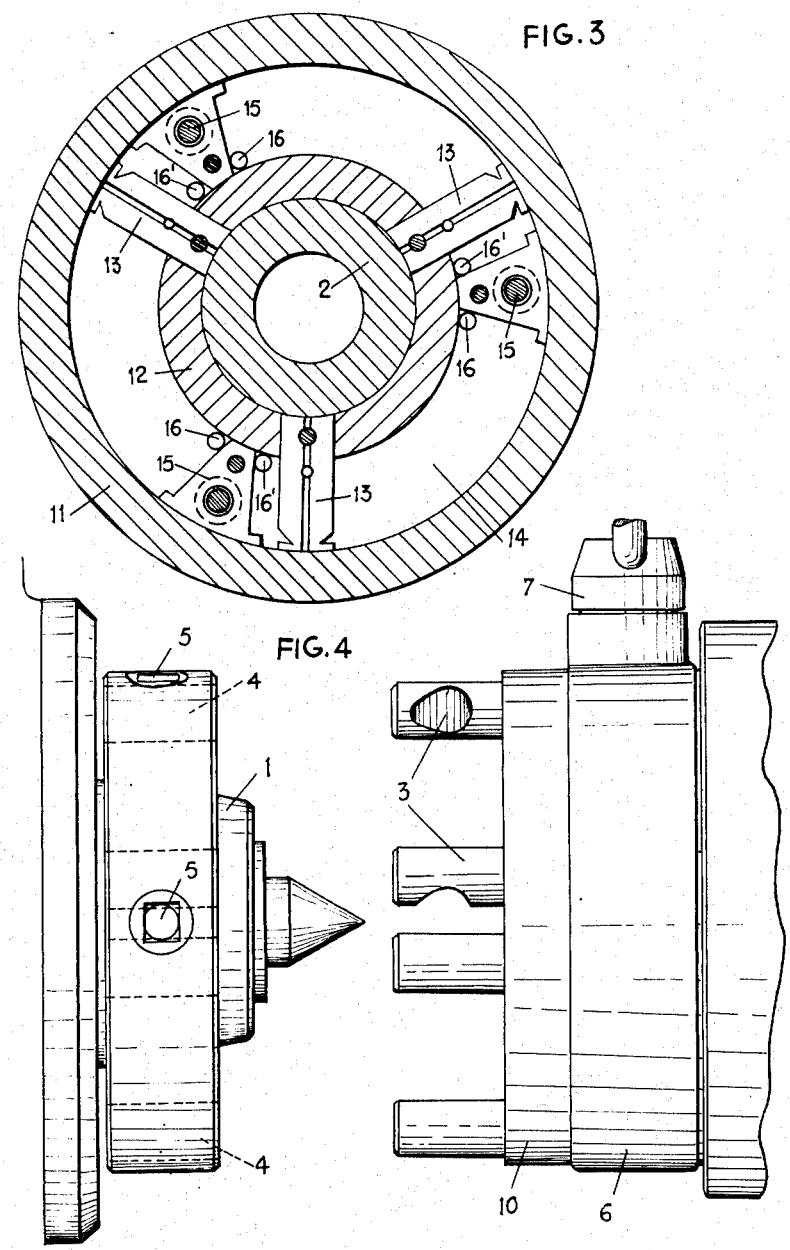
Inventor
Guiseppi di Pali
By Robert E Burns
Attorney Oct. 13, 1953 G. DI PALO 2,655,383
FLUID PRESSURE OPERATED ROTARY WORK OR TOOL HOLDER
Filed Aug. 21, 1951 8 Sheets-Sheet 4

Inventor
Guiseppi di Pali
By Robert E Burns
Attorney

Oct. 13, 1953  G. DI PALO  2,655,383
FLUID PRESSURE OPERATED ROTARY WORK OR TOOL HOLDER
Filed Aug. 21, 1951  8 Sheets-Sheet 5
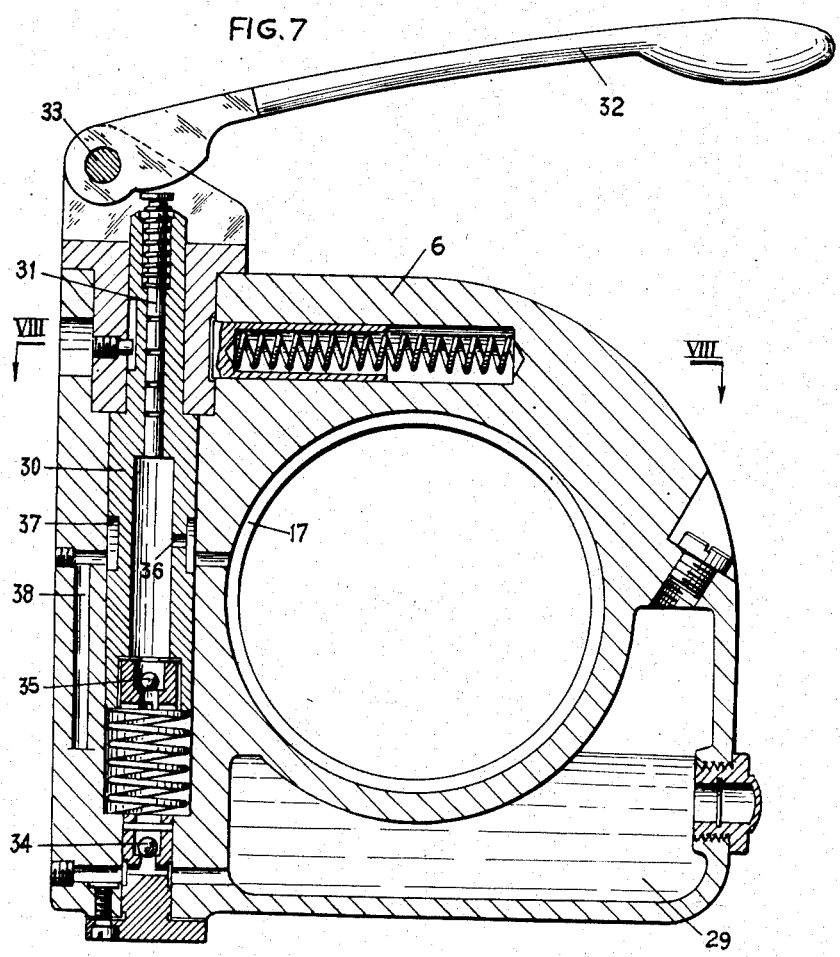
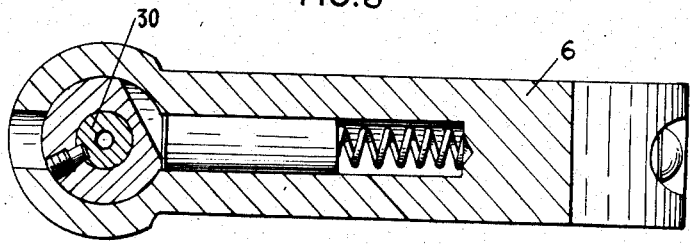
Inventor
Guiseppi di Pali
By Robert E Burns
Attorney Oct. 13, 1953 G. DI PALO 2,655,383
FLUID PRESSURE OPERATED ROTARY WORK OR TOOL HOLDER
Filed Aug. 21, 1951 8 Sheets-Sheet 6

Inventor
Guiseppi di Poli
By Robert E. Burns
Attorney

Oct. 13, 1953 G. DI PALO 2,655,383
FLUID PRESSURE OPERATED ROTARY WORK OR TOOL HOLDER
Filed Aug. 21, 1951 8 Sheets-Sheet 8

Inventor
Guiseppi di Pali
By Robert E Burns
Attorney

Patented Oct. 13, 1953

2,655,383

UNITED STATES PATENT OFFICE 2,655,383

FLUID PRESSURE OPERATED ROTARY WORK OR TOOL HOLDER

Giuseppe Di Palo, Turin, Italy

Application August 21, 1951, Serial No. 242,939
In Italy October 21, 1950

1 Claim. (Cl. 279—4)

This invention relates to fluid-pressure operated rotary work or tool holders, such as self-centering chucks, expending chucks and the like, which are provided with radially-movable clamping members.

Self-centering chucks known heretofore are of two main types viz. hand-operated and mechanically controlled.

In mechanically actuated types the jaws are radially displaced for clamping by means of a cam or spiral device driven through gears, the control being transmitted from the outside by means of a hand tool, and rotation of the chuck must be stopped in order to perform this operation. Consequently, in order to clamp the work, a hand operation has to be performed, which each time entails work and loss of time.

In order to avoid this drawback it has been proposed to use hydraulically or pneumatically operated chucks.

The arrangements known heretofore, more particularly hydraulically operated chucks, all include an hydraulic piston actuating through a central rod ratchet gears transmitting movement to the radial work-holding jaws.

This arrangement, however, fills the bore in the supporting spindle, which cannot therefore be utilised for fitting material in the form of bars or rods through the spindle.

These devices are moreover of considerable weight, they acquire on rotation a high kinetic energy, and are moreover clumsy and difficult to fit to existing machines.

Moreover, the hydraulic pitson is constantly under oil pressure or under air pressure in the case of a pneumatic control, and it is essential for the pressure not to fail during clamping, as this would release the clamped work with serious danger to the operator.

Finally, the arrangements known heretofore are constantly under pressure and therefore subject to oil leakage in hydraulic control, or air leakage in pneumatic control, so that the efficiency is low and operation expensive.

It would be essential for the self-centering chuck to effect a non-reversible clamping and for the means controlling closure of the chuck to become operative just as the closing or releasing operation is effected.

The main object of this invention is to solve the problem by firmly clamping and releasing by and from the jaws a workpiece by means of an hydraulic control by the same cycle of operations which would be performed by the operator for operating the chuck by means of a cross spanner, and with the advantage that operation may be carried out whether the spindle is stationary or rotates at operating speed.

Revolving clamping heads may be of the mechanical, hydraulic or pneumatic type and may be subdivided from the standpoint of operation into two main groups:

(1) Clamping is controlled at the back of the spindle. In this case the plug fills the whole bore, or a tubular plug is employed which considerably reduces the spindle bore, thereby impairing the performance of the machine.

In this method of clamping a pneumatic or hydraulic piston is commonly employed, which limits the bore and does not afford irreversibility of clamping. Therefore, if pressure fails the work is released. These devices are moreover clumsy and heavy and acquire a high kinetic energy on rotation, which has led to duralumin being employed for their manufacture.

(2) Clamping is controlled at the front of the spindle. Known constructions with front clamping are all of the mechanical type.

This invention provides a revolving clamping head utilizing a rotary hydraulic or pneumatic piston, by which it is possible to clamp workpieces or bars, leaving the central bore free, during rotation, without the necessity of stopping the machine, the device being irreversible and the action of the hydraulic pressure being required merely on clamping or releasing of the jaws.

In order to make the principles of this invention better understood, it will be necessary to consider first known systems for effecting radial movement of the jaws, in self-centering chucks, or of the jaw chucks.

In the former case, the best known constructions are:

Taylor's, in which the jaw chucks are moved by a front spiral disc,

Coventry type, in which the same movement is obtained by means of radial cams co-operating with as many jaw chucks.

Forkhardt's, in which the jaw chucks are moved by toothed slides co-operating with a common central control gear.

The jaw chuck control ordinarily consists of a conical bushing, the axial movement of which clamps the jaw chucks.

All these devices are irreversible, which means that no movement of the spiral, cams, gear and control bushing may be produced by acting on the jaw chucks or jaws. On the other hand, it will be obvious that many other devices may be developed affording irreversibility.

A first characteristic feature of the hydraulic control device according to this invention consists in the fact that it comprises radially-movable clamping members, actuated by an irreversible mechanical system, the said mechanical system being actuated on clamping and released by means of a pressure fluid acting on a double-acting rotary piston operatively connected with the said mechanical system, means being provided for delivering the pressure fluid into the chamber of said piston whether the support of said clamping members rotates or not.

A further characteristic feature of the device according to this invention resides in the fact that the fluid delivery means also serve, according to a further development, for producing pressure on said fluid as required for actuating the rotary piston.

Further characteristics and advantages of the device according to this invention will be understood from the following description, in which reference is made to the accompanying drawings, given by way of example, wherein:

Figure 1 is a cross section of the device used for actuation of a self-centering chuck;

Figure 2 is an axial section thereof;

Figure 3 is a section on line III—III of Figure 2;

Figure 4 is an outer view of the means for fitting the device to a revolving bedplate;

Figure 7 is a cross section of a modification of the device for feeding and delivering pressure fluid;

Figure 8 is a section on line VIII—VIII of Figure 7;

Figures 9, 10 and 11 are two elevations and a plan view, respectively, of a further modification of the delivery device;

Figures 15 and 16 are two axial sections of the expanding chuck control device;

Figure 5:
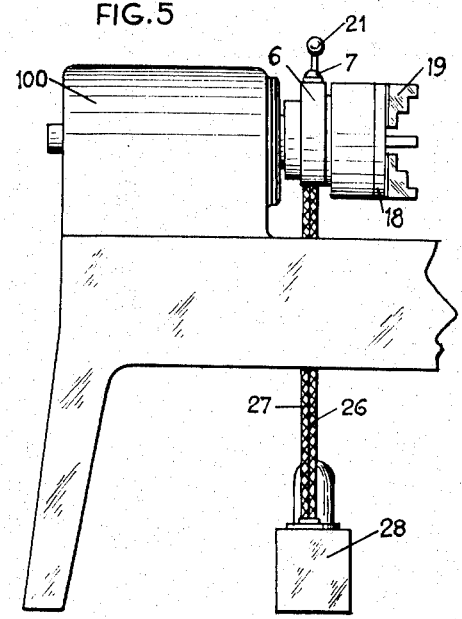
Figures 5 and 6 are two views of the device with an external source of pressure fluid.

Referring to Figures 1 to 4, 1 denotes the spindle of a lathe having fixedly attached thereto a flanged hub 2. In the case of screw-threaded spindles, the hub may be simply screwed (Figure 2); in other cases for instance, a set of flange attachments 3 may be provided (Figure 4) engaged by suitable recesses 4 and blocked by means of eccentric pins 5.

The hub 2, which rotates together with the spindle 1 of the headstock, has arranged thereon a fixed collar 6 provided with a cock valve 7 for delivering pressure fluid, such as oil, fed through an inlet connection 8. 9 denotes the outlet connection. A ring 10, fixedly connected with the hub 2, retains the fixed collar 6.

A ring 11 is bolted to the flange on the hub 2 and encloses the chamber of the rotating piston formed by a sleeve 12 rotatable on the hub 2 and provided with radial vanes 13 movable in the annular chamber 14 of the piston between the fixed abutments 15 fixedly connected to the ring 11. 16 and 16' denote oil conduits opening at one end into the piston chamber 14 and at their other end into two annular circumferential grooves 17, 17', respectively, cut in the fixed collar 6 and connecting with the cock valve 7, of which the operation is described hereinafter.

By feeding pressure oil through the conduits 16 and connecting the conduits 16' to the outlet connection 9, the piston 12—13 rotates clockwise. Rotation is reversed by exchanging the functions of the conduits 16, 16', said reversal being effected even during rotation of the spindle 1, for the grooves 17 and 17' constantly connect with the cock valve 7.

A face plate 18 of a self-centering chuck having jaws 19 is bolted to the hub 2 and ring 11. It will be obvious that by providing on the flange 12', the spiral cam or teeth, according to the irreversible jaw control device mentioned above, rotation of the sleeve 12 simultaneously displaces all the jaws in a radial direction. The example shown in Figure 2 corresponds to the Goventry type, the cams being formed directly at 20 in the flange 12' of the sleeve 12 and co-operating with slides 19' each of which is fast with a jaw 19.

On account of the irreversibility of the mechanical system, it is not necessary for the oil pressure to act on the faces of the piston 12—13 during the whole of the time of machining, with inherent danger of breakage of the pipings, accidental failure of pressure, etc., and it will be sufficient for the rotating piston to perform clamping or release just on operation of the cock valve 7.

The valve comprises a cylindrical section 7' rotatable about its axis on operation by hand by means of the lever 21. The section 7' is formed with peripheral passages 22 and internal passages 23 arranged in a manner such as to establish in co-operation with ports 24 and 25 opening into the annular grooves 17, 17', respectively, three different combinations of communications, viz:

(a) Inlet connection 8—conduits 17, 16; outlet connection 9—conduits 17', 16';

(b) Inlet connection 8—outlet connection 9; conduits 17, 16, 16', 17';

(c) Inlet connection 8—conduits 17', 16'; outlet connection 9—conduits 17, 16.

This gives three positions of the lever 21, of which the positions (a) and (c) are clamping and release positions, respectively, while in position (b) the source of oil is by-passed and at the same time the pressures on the vanes 13 are balanced. The manual operation is similar to operation by means of a hand tool. By displacing the lever 21 to the position (a), the jaws 19 perform the clamping movement, whereupon the lever 21 is brought to its idle position (b). Release is obtained by displacing the lever 21 to its position (c) and again returning it to (b). In the case of new machines, the fixed collar 6 and cock valve 7 may be integral with the headstock 100 (Figure 5) of the machine tool, enclosing an oil pump or not, so that any small oil loss through leakage may easily be recovered in the machine. Oil is then supplied to the piston chamber through longitudinal passages formed in the spindle walls.

Figure 6:
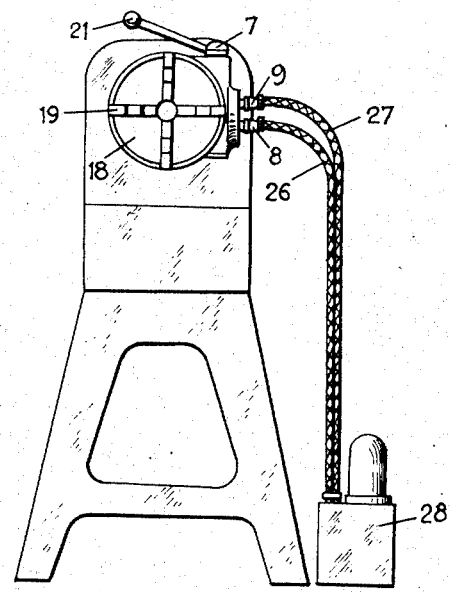
Figure 16:
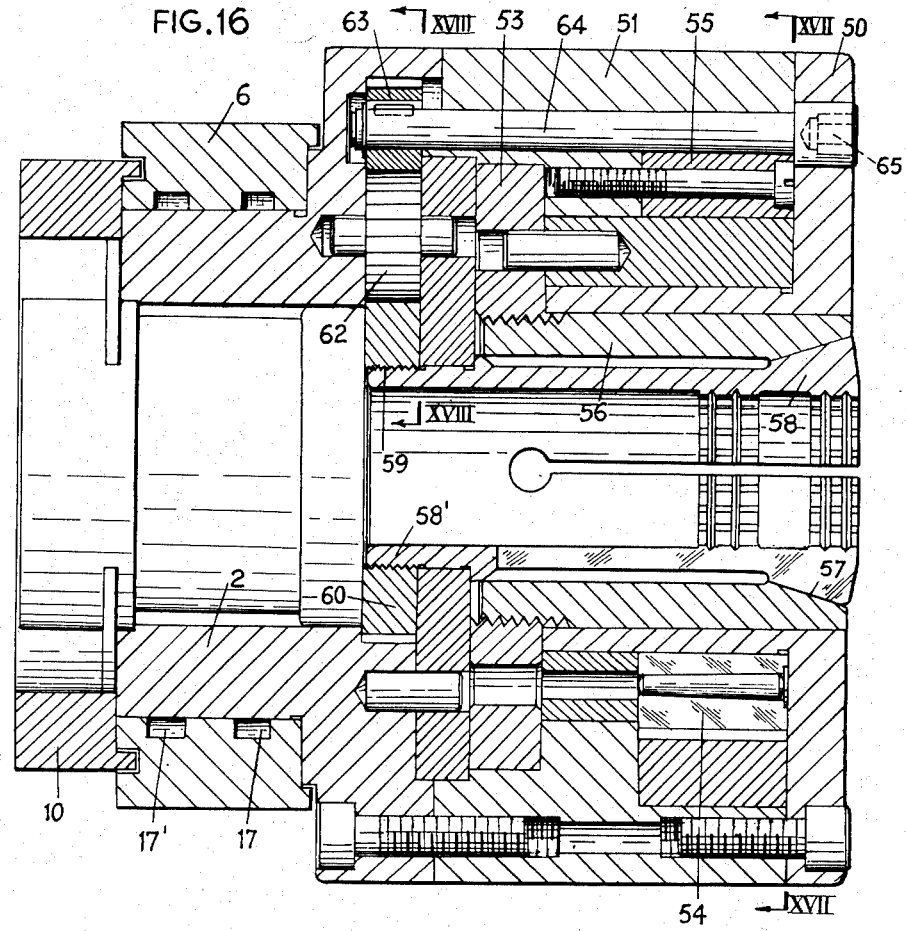
Figure 12:
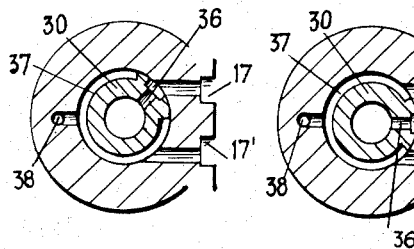
Figures 12, 13 and 14 show the three main positions of the delivery valve.
Figure 13:
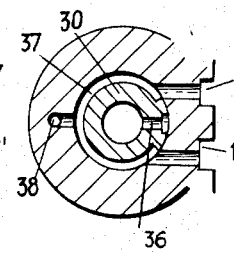
Figure 14:
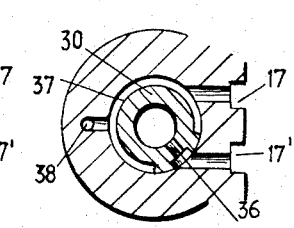
Figure 17:
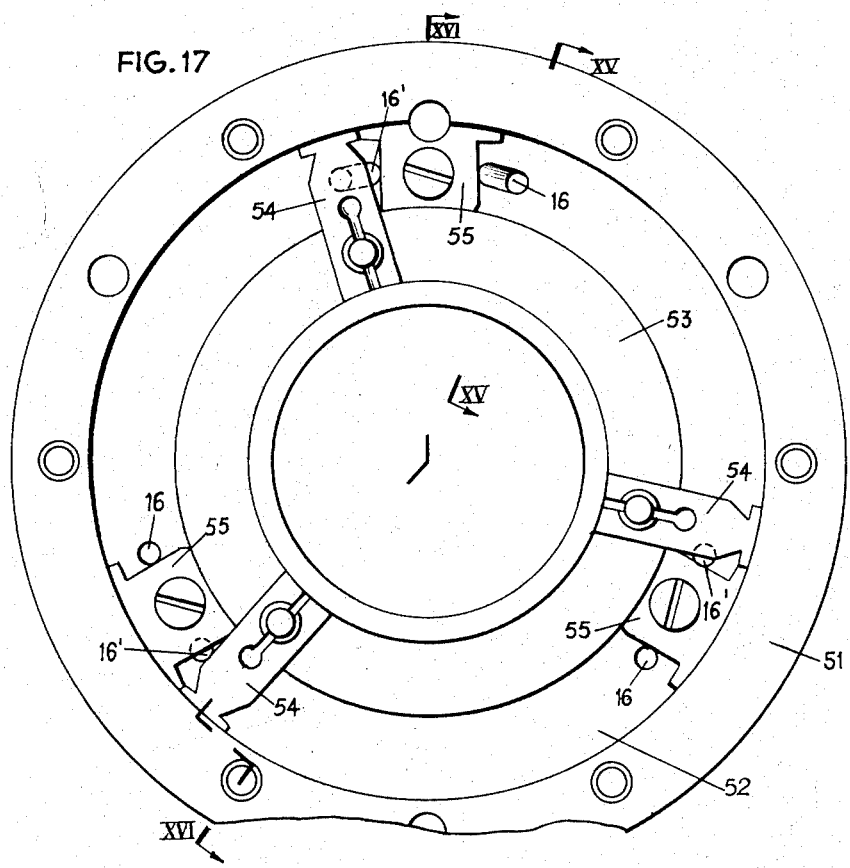
Figures 17 and 18 are two cross sections on lines XVII—XVII and XVIII—XVIII of Figure 16, respectively.
Figure 18:
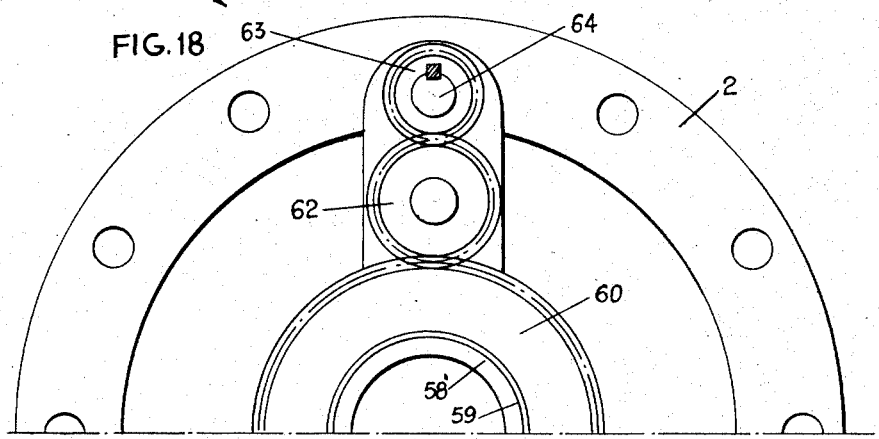

Pressure oil may be supplied by a source external of the device, as shown in Figures 6 and 5, in which the connections 8 and 9 are connected through pipes 26, 27, respectively, with an electro-pump 28. On the other hand, the source of oil may be incorporated into the fixed collar 6, as shown in Figures 7 and 8. In the said figures, 29 denotes an oil reservoir formed in the collar 6, from which oil may be pumped and delivered to the piston chambers by means of the cock valve 30 operating also as a fluid-pressure jack actuated by the operator by hand. A small piston 31 serves for producing a high final clamping pressure without requiring an increase in the force applied to the operating lever 32 oscillating about the pin 33. The pumped oil flows through the non-return valves 34, 35, respectively, into the section 30 of the jack and valve unit, whence it is delivered into either of the annular conduits 17, 17' as shown in Figures 12, 13 and 14 corresponding to the clamping, idle and release positions of the jaws, respectively. By rotating the section 30 about its axis, the oil contained therein flows through a radial passage 36 into the circumferential groove 17 (clamping position, Figure 12), while the groove 17' is connected over an annular groove 37, cut in the section 30, to a passage 38 leading back to the reservoir 29. Upon clamping, the cock is rotated to the position shown in Figure 14, in which both grooves 17, 17' freely connect with the reservoir 29, so that the rotating piston is in a balanced medium. Figure 14 shows the position of the delivery cock ready for release.

Instead of being provided with a hand pump, the device may be advantageously fitted with a delivery pump actuated by the operator's foot (Figures 9, 10, 11). The oil reservoir, cock and pump are enclosed within a casing 40 provided with an operating pedal 41 and connected by means of pipes 42, 43 with connections on the fixed collar 6.

Operation is the same as described in connection with Figures 7, 8, 12, 13, 14.

The use of the device according to this invention in connection with a revolving clamping head is shown by way of example in Figures 15 to 18. In these figures 2, 6 and 10 denote the flanged hub, fixed collar and protecting ring previously described, the fixed collar 6 being formed with two circumferential grooves 17, 17' for the flow of oil to the chamber of the rotating piston. The hub 2 is integral with a face plate 50 and an annular member 51 enclosing the chamber 52 of the rotating piston and comprising a ring 53 provided with vanes 54 movable between abutment blocks 55 fixed to the annular member 51. 16, 16' denote the oil supply conduits connecting with the piston chamber 52 and circumferential grooves 17, 17' respectively. The ring 53 is screwed to the inner end of a sleeve 56 kept from rotating and ending in front by an internal cone 57 co-operating with the flared end of the expanding chuck 58. During rotation of the ring 53, the sleeve 56 performs axial displacements clamping or releasing the expanding chuck 58.

For operation of the device it will be sufficient for one of the couplings 53—56 or 57—58 to be irreversible, which may be carried out in any case without any difficulty.

In order to facilitate replacement of the jaw without removing the whole device from the machine spindle, the inner end 58' of the expanding chuck 58 is engaged by the internal screw-thread 59 of a toothed wheel 60, the expanding chuck being kept against rotation by a plug 61. The toothed wheel 60 is coupled through an intermediate pinion 62 with a pinion 63 keyed to a pivot 64 formed at its front end with a recess 65 for a spanner. Rotation of the pivot 64 rotates the toothed wheel 60 and screws or unscrews the expanding chuck 58 on replacement, so that the chuck may be removed at the front end of the revolving head.

Figure 19:
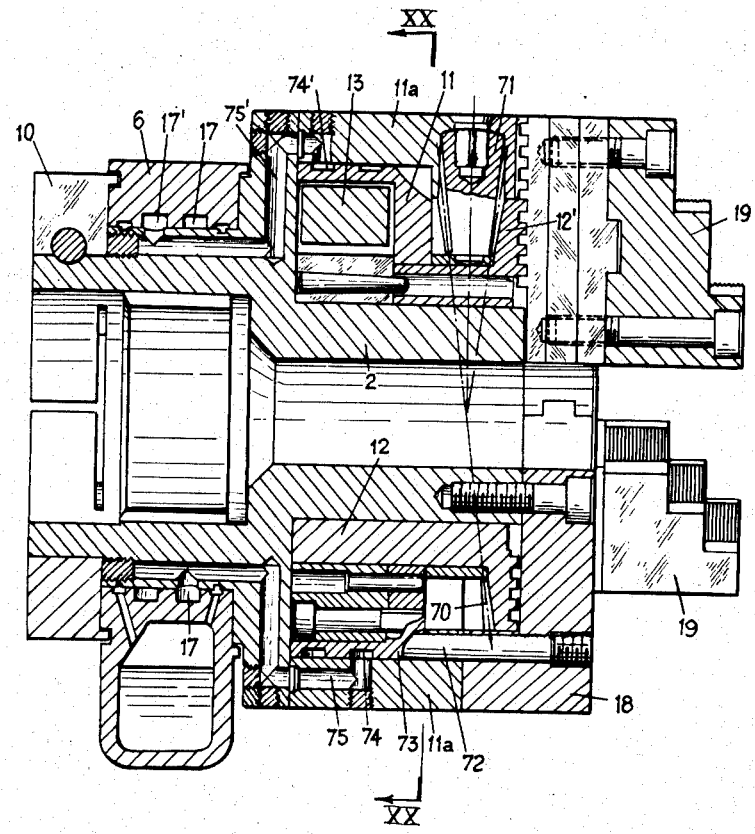
Figure 19 is an axial section of a modification of the device with a self-centering chuck of the Taylor type.
Figure 20:
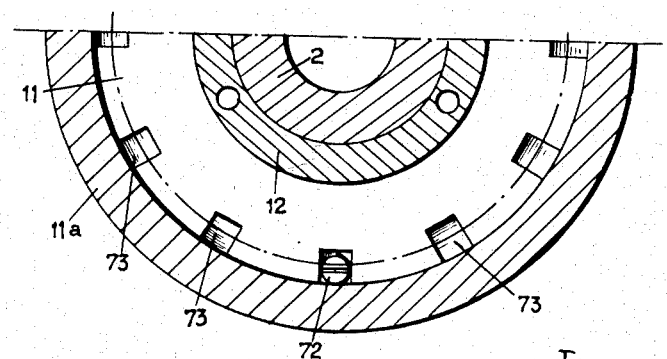
Figure 20 is a section on line XX—XX of Figure 19.

Since the limited rotation of the rotating piston may in certain cases be insufficient for producing the full stroke of the chucks in a self-centering chuck, for instance in the spiral spindle of the Taylor type, which is most commonly employed, the invention provides external means for initial approach of the chucks to the work, while further clamping and release movement may be performed by the fluid-pressure mechanism described above without any substantial difference in operation. In Figures 19 and 20 the same reference numerals are used to denote essential parts as in Figures 1 to 3.

The substantial difference in construction resides in the fact that the ring 11 enclosing the piston chamber is rotatably mounted in an annular casing 11a fast with the hub 2 and face plate 18 of the spindle. The flange 12' on the sleeve 12 of the piston is provided at its rear end with bevel teeth 70 co-operating with a bevel pinion 71 rotatable in the annular casing 11a and actuated when the machine is at standstill by means of a suitable spanner. 72 denotes a clamping screw of which the tip is engaged by one of the notches 73 cut in the periphery of the ring 11.

In order initially rapidly to approach the chucks 19 to the work, the screw 72 is loosened, the spanner is fitted into the pinion 71 which is rotated in the desired direction, thereby rotating the flange 12 and rotary piston unit. Movement is transmitted at one end to the chucks 19 and at the other end to the ring 11, of which the abutments are carried along by the vanes 13. On coarse approach of the chucks to the work, the screw 72 is screwed into the nearest notch 73, retaining the ring 11. In order to ensure supply of oil to the ring, independently of its angular position, the latter is formed with peripheral grooves 74, 74' respectively, which, by means of conduits 75, 75', constantly connect with grooves 17, 17', respectively, in the fixed collar 6. Clamping and release of the chucks takes place as in the previously described cases.

It will be understood that various details of the device according to this invention may be improved and modified according to the various irreversible mechanical devices supporting the chucks or jaws, without departing from the scope of this invention.

What I claim is:

In a machine tool having a head-stock and a rotary spindle therein, a rotary support fast with said spindle, radially movable jaws carried by said support, irreversible means within said support actuating said jaws for radial movement, a pressure fluid working chamber within said support, a double acting rotary piston rotatable within said chamber coaxial with the spindle, said piston actuating said irreversible means for effecting the opening and closing movements of the jaws, a fixed collar embracing said support and formed with conduits for delivering and discharging pressure fluid to and from said pressure chamber, a working fluid reservoir in said collar, a manually operated cock means incorporated with said collar, said cock means having a cylinder communicating with the reservoir, and a cylindrical body rotatable and reciprocable within said cylinder, fluid passages within said body for selectively connecting each of said conduits with said cylinder and short-circuiting said conduits respectively therebetween, by the rotation of the body within the cylinder, and non-return valves associated with said cylinder whereby said body and the cylinder provide a reciprocating pump delivering the working fluid from the reservoir to the working chamber.

GIUSEPPE DI PALO.

References Cited in the file of this patent

UNITED STATES PATENTS

| Number | Name | Date |
|---|---|---|
| 1,778,601 | Kempton et al. | Oct. 14, 1930 |
| 2,457,909 | McKay et al. | Jan. 4, 1949 |
| 2,476,781 | Tomlinson | July 19, 1949 |

FOREIGN PATENTS

| Number | Country | Date |
|---|---|---|
| 599,708 | Germany | 1934 |
| 623,665 | Germany | 1936 |